(12) United States Patent
Zhou et al.

(10) Patent No.: US 10,153,921 B2
(45) Date of Patent: Dec. 11, 2018

(54) SELF-INTERFERENCE CHANNEL ESTIMATION METHOD AND DEVICE

(71) Applicant: HUAWEI TECHNOLOGIES CO., LTD., Shenzhen, Guangdong (CN)

(72) Inventors: Juan Zhou, Shenzhen (CN); Ran Zhao, Langfang (CN); Huajiong Lin, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 27 days.

(21) Appl. No.: 15/419,393

(22) Filed: Jan. 30, 2017

(65) Prior Publication Data

US 2017/0141937 A1    May 18, 2017

Related U.S. Application Data

(63) Continuation of application No. PCT/CN2015/074588, filed on Mar. 19, 2015.

(30) Foreign Application Priority Data

Jul. 31, 2014    (CN) .......................... 2014 1 0375112

(51) Int. Cl.
    *H04B 1/10*    (2006.01)
    *H04L 5/14*    (2006.01)
    (Continued)

(52) U.S. Cl.
    CPC ....... *H04L 25/0204* (2013.01); *H04B 1/1027* (2013.01); *H04L 5/1461* (2013.01);
    (Continued)

(58) Field of Classification Search
    CPC ................... H04B 1/0475; H04B 1/10; H04B 1/1018–1/1036;
    (Continued)

(56) References Cited

U.S. PATENT DOCUMENTS

2011/0143655 A1* 6/2011 Ahn .................... H04B 7/15542
                                                                    455/9
2012/0201153 A1    8/2012 Bharadia et al.
(Continued)

FOREIGN PATENT DOCUMENTS

CN      103166883 A    6/2013
CN      103338172 A    10/2013
(Continued)

OTHER PUBLICATIONS

International Search Report dated Jun. 16, 2015 in corresponding International Patent Application No. PCT/CN2015/074588.
(Continued)

*Primary Examiner* — Timothy J Weidner
(74) *Attorney, Agent, or Firm* — Staas & Halsey LLP

(57) ABSTRACT

A self-interference channel estimation method and device, where the method includes: determining, when a receive port of the first device receives a first signal, a second signal transmitted by a transmit port of the first device, wherein the first signal comprises a service signal from a second device, and comprises a self-interference signal originated from the second signal interfering, through an air interface, with the service signal from the second device, wherein service data comprised in the second signal is segmented into at least two segments, and a signal sequence formed by at least one preset character is inserted between the at least two segments of service data; estimating, according to the first signal and the second signal, the self-interference signal originated from the second signal; and eliminating the estimated self-interference signal from the received first signal.

10 Claims, 6 Drawing Sheets

(51) Int. Cl.
  *H04L 25/02* (2006.01)
  *H04L 25/08* (2006.01)
  *H04W 24/08* (2009.01)
(52) U.S. Cl.
  CPC ........ *H04L 25/022* (2013.01); *H04L 25/0224* (2013.01); *H04L 25/08* (2013.01); *H04W 24/08* (2013.01)
(58) Field of Classification Search
  CPC .. H04B 2001/1045–2001/1072; H04L 5/1461; H04L 25/0202–25/0258; H04L 25/08–25/085; H04W 24/02–24/10
  See application file for complete search history.

(56) References Cited

U.S. PATENT DOCUMENTS

| 2013/0301484 | A1  | 11/2013 | Khandani |            |
|--------------|-----|---------|----------|------------|
| 2014/0198688 | A1  | 7/2014  | Li et al.|            |
| 2015/0103802 | A1* | 4/2015  | Cheng    | H04L 5/0048 |
|              |     |         |          | 370/330    |
| 2015/0200764 | A1* | 7/2015  | Lin      | H04B 1/525 |
|              |     |         |          | 370/278    |

FOREIGN PATENT DOCUMENTS

| CN | 103516638 A       | 1/2014 |
| EP | 2 860 925 A1      | 4/2015 |
| WO | 2014/000432 A1    | 1/2014 |
| WO | WO 2014/000432 A1 * | 1/2014 |

OTHER PUBLICATIONS

Li, Na "Digital Self-Interference Cancellation in Single Channel Full-Duplex Communication System", Electronic Technology & Information Science, China Master's Thesis Full Text Database, 2013 No. 11, Nov. 15, 2013 (Nov. 15, 2013).

International Search Report, dated Jun. 16, 2015, in International Application No. PCT/CN2015/074588 (4 pp.).

Chinese Office Action dated Jan. 2, 2018 in corresponding Chinese Patent Application No. 201410375112.5, 8 pp.

Extended European Search Report dated Jun. 20, 2017 in corresponding European Patent Application No. 15826594.2.

* cited by examiner

SELF-INTERFERENCE CHANNEL ESTIMATION METHOD AND DEVICE

CROSS-REFERENCE TO RELATED APPLICATIONS

This application is a continuation of International Application No. PCT/CN2015/074588, filed on Mar. 19, 2015, which claims priority to Chinese Patent Application No. 201410375112.5, filed on Jul. 31, 2014. The disclosures of the aforementioned applications are hereby incorporated by reference in their entireties.

TECHNICAL FIELD

The present disclosure relates to the field of wireless communications technologies, and in particular, to a self-interference channel estimation method and device.

BACKGROUND

In a current wireless communications system, a time division duplex technology or a frequency division duplex technology is used to implement bidirectional communication. In a time division duplex communications system, data is transmitted by using a same frequency but in different timeslots, which effectively isolates interference between uplink and downlink; in a frequency division duplex communications system, data is transmitted in a same timeslot but by using different frequencies, which effectively isolates interference between uplink and downlink. It may be learned that, in the time division duplex communications system, a time domain resource of a radio spectrum is sacrificed, and in the frequency division duplex communications system, a frequency domain resource of a radio spectrum is sacrificed, which causes relatively low resource usage of the radio spectrum.

As wireless data services increase day by day, a spatial radio channel becomes increasingly congested. In this case, a co-frequency co-time full duplex (CCFD) system is proposed, where in the co-frequency co-time full duplex system, uplink and downlink data can be transmitted in a same timeslot and in a same frequency, thereby improving resource usage of the radio spectrum.

However, in the co-frequency co-time full duplex system, a wireless device has both a receive end function and a transmit end function; and signal receiving and signal sending are performed at a same time and in a same frequency. Therefore, a first signal generated by the wireless device itself causes, on a radio channel, interference to a second signal sent by an external device and received by the wireless device used as a received end. The interference is referred to as self-interference, and the first signal is also referred to as a self-interference signal.

Due to a location relationship between receive and transmit antennas in the wireless device, interference strength of the self-interference signal is far higher than signal strength of the second signal sent by the external device and received by the wireless device. Therefore, in the co-frequency co-time full duplex system, the interference strength generated by the self-interference signal greatly affects the second signal sent by the external device and received by the wireless device, thereby deteriorating communication performance of the wireless device.

To improve the communication performance of the co-frequency co-time full duplex system, and effectively eliminate interference generated by the self-interference signal, a digital self-interference suppressing method, an analog self-interference suppressing method, an antenna self-interference suppressing method, and the like are proposed. In addition, a self-interference channel estimation technology is a key factor that affects a self-interference suppressing technology.

However, currently used self-interference channel estimation methods mainly include two types: One type is a channel estimation method based on adaptive filtering; the other type is a channel estimation method based on a pilot. However, in a practical application process, during self-interference channel estimation by means of the two types of methods, once the wireless device receives the second signal sent by the external device, which means that a wanted signal appears in the system, precision of self-interference channel estimation declines, which leads to performance deterioration of self-interference channel estimation.

SUMMARY

In view of this, embodiments of the present application of the present application provide a self-interference channel estimation method and device, so as to resolve a problem that performance deterioration of self-interference channel estimation is caused by poor channel estimation precision of a self-interference signal in a co-frequency co-time full duplex system.

According to a first aspect of the present application of the present application, a self-interference channel estimation method is provided, where the method includes:

determining, by a first device when a receive port of the first device receives a first signal, a second signal transmitted by a transmit port of the first device, where the first signal includes a service signal that a second device sends to the first device, and includes a self-interference signal of interference that the second signal transmitted by the transmit port of the first device causes, through an air interface, to the service signal received by the receive port of the first device, where service data included by the second signal is segmented into at least two segments, and a signal sequence formed by at least one preset character is inserted between the at least two segments of service data;

estimating, according to the first signal and the second signal, the self-interference signal of interference that the second signal transmitted by the transmit port of the first device causes, through the air interface, to the service signal received by the receive port of the first device; and eliminating the self-interference signal from the received first signal.

With reference to the possible implementation manner of the first aspect of the present application of the present application, in a first possible implementation manner, the estimating, according to the first signal and the second signal, the self-interference signal of interference that the second signal transmitted by the transmit port of the first device causes, through the air interface, to the service signal received by the receive port of the first device includes:

estimating, by using the first signal and the second signal, a channel value of a channel over which the second signal transmitted by the transmit port of the first device causes, through the air interface, interference to the service signal received by the receive port of the first device; and estimating, according to the channel value and the second signal, the self-interference signal of interference that the second signal transmitted by the transmit port of the first device causes, through the air interface, to the service signal received by the receive port of the first device.

With reference to the first possible implementation manner of the first aspect of the present application of the present application, in a second possible implementation manner, the estimating, by using the first signal and the second signal, a channel value of a channel over which the second signal transmitted by the transmit port of the first device causes, through the air interface, interference to the service signal received by the receive port of the first device includes:

performing fast Fourier transform FFT on the determined second signal to obtain a first frequency domain value;

performing time domain accumulation and frequency domain accumulation on a modular square of the first frequency domain value, and performing normalization processing on an accumulation result to obtain a first normalization result;

performing radio frequency processing and analog-to-digital conversion ADC on the received first signal to obtain a digital signal;

performing FFT on the digital signal to obtain a second frequency domain value;

multiplying a conjugate of the first frequency domain value by the second frequency domain value, performing time domain accumulation and frequency domain accumulation on an obtained product, and performing normalization processing on an accumulation result to obtain a second normalization result; and estimating, according to the first normalization result and the second normalization result, the channel value of the channel over which the second signal transmitted by the transmit port of the first device causes, through the air interface, interference to the service signal received by the receive port of the first device.

With reference to the second possible implementation manner of the first aspect of the present application of the present application, in a third possible implementation manner, the estimating, according to the first normalization result and the second normalization result, the channel value of the channel over which the second signal transmitted by the transmit port of the first device causes, through the air interface, interference to the service signal received by the receive port of the first device includes:

dividing the second normalization result by the first normalization result, and considering an obtained quotient value as the estimated channel value of the channel over which the second signal transmitted by the transmit port of the first device causes, through the air interface, interference to the service signal received by the receive port of the first device.

With reference to the first possible implementation manner of the first aspect of the present application, or with reference to the second possible implementation manner of the first aspect of the present application, or with reference to the third possible implementation manner of the first aspect of the present application, in a fourth possible implementation manner, the estimating, according to the channel value and the second signal, the self-interference signal of interference that the second signal transmitted by the transmit port of the first device causes, through the air interface, to the service signal received by the receive port of the first device includes:

multiplying the channel value by the first frequency domain value, performing inverse fast Fourier transform IFFT on an obtained product, and considering a transform result as the self-interference signal of interference that the second signal transmitted by the transmit port of the first device causes, through the air interface, to the service signal received by the receive port of the first device.

With reference to the second possible implementation manner of the first aspect of the present application, or with reference to the third possible implementation manner of the first aspect of the present application, or with reference to the fourth possible implementation manner of the first aspect of the present application, in a fifth possible implementation manner, if the determined second signal is an analog signal, where the analog signal is obtained by performing digital-to-analog conversion DAC and radio frequency processing on a signal sequence that is formed by at least one preset character and inserted between at least two segments of service data that are obtained by segmenting included service data, the performing FFT on the determined second signal to obtain a first frequency domain value includes:

performing radio frequency processing and analog-to-digital conversion ADC on the determined analog signal to obtain a digital signal corresponding to the analog signal, and performing FFT on the digital signal corresponding to the analog signal to obtain the first frequency domain value.

With reference to the possible implementation manner of the first aspect of the present application, or with reference to the first possible implementation manner of the first aspect of the present application, or with reference to the second possible implementation manner of the first aspect of the present application, or with reference to the third possible implementation manner of the first aspect of the present application, or with reference to the fourth possible implementation manner of the first aspect of the present application, or with reference to the fifth possible implementation manner of the first aspect of the present application, in a sixth possible implementation manner, the signal sequence formed by at least one preset character is a signal sequence formed by all zeros.

According to a second aspect of the present application, a self-interference channel estimation device is provided, where the estimation device includes:

a receiving module, configured to receive a first signal on a receive port of the first device, where the first signal includes a service signal that a second device sends to the first device, and includes a self-interference signal of interference that a second signal transmitted by a transmit port of the first device causes, through an air interface, to the service signal received by the receive port of the first device;

a determining module, configured to: when the receiving module receives the first signal, determine the second signal transmitted by the transmit port of the first device, where service data included by the second signal is segmented into at least two segments, and a signal sequence formed by at least one preset character is inserted between the at least two segments of service data;

an estimation module, configured to estimate, according to the first signal received by the receiving module and the second signal determined by the determining module, the self-interference signal of interference that the second signal transmitted by the transmit port of the first device causes, through the air interface, to the service signal received by the receive port of the first device; and an elimination module, configured to eliminate the self-interference signal from the received first signal.

With reference to the possible implementation manner of the second aspect of the present application, in a first possible implementation manner, the estimation module is specifically configured to estimate, by using the first signal and the second signal, a channel value of a channel over which the second signal transmitted by the transmit port of the first device causes, through the air interface, interference to the service signal received by the receive port of the first device; and estimate, according to the channel value and the second signal, the self-interference signal of interference that the second signal transmitted by the transmit port of the first device causes, through the air interface, to the service signal received by the receive port of the first device.

With reference to the first possible implementation manner of the second aspect of the present application, in a second possible implementation manner, the estimation module is specifically configured to perform fast Fourier transform FFT on the determined second signal to obtain a first frequency domain value, perform time domain accumulation and frequency domain accumulation on a modular square of the first frequency domain value, and perform normalization processing on an accumulation result to obtain a first normalization result;

perform radio frequency processing and analog-to-digital conversion ADC on the received first signal to obtain a digital signal, and perform FFT on the digital signal to obtain a second frequency domain value;

multiply a conjugate of the first frequency domain value by the second frequency domain value, perform time domain accumulation and frequency domain accumulation on an obtained product, and perform normalization processing on an accumulation result to obtain a second normalization result; and estimate, according to the first normalization result and the second normalization result, the channel value of the channel over which the second signal transmitted by the transmit port of the first device causes, through the air interface, interference to the service signal received by the receive port of the first device.

With reference to the second possible implementation manner of the second aspect of the present application, in a third possible implementation manner, the estimation module is specifically configured to divide the second normalization result by the first normalization result, and consider an obtained quotient value as the estimated channel value of the channel over which the second signal transmitted by the transmit port of the first device causes, through the air interface, interference to the service signal received by the receive port of the first device.

With reference to the first possible implementation manner of the second aspect of the present application, or with reference to the second possible implementation manner of the second aspect of the present application, or with reference to the third possible implementation manner of the second aspect of the present application, in a fourth possible implementation manner, the estimation module is specifically configured to multiply the channel value by the first frequency domain value, perform inverse fast Fourier transform IFFT on an obtained product, and consider a transform result as the estimated self-interference signal of interference that the second signal transmitted by the transmit port of the first device causes, through the air interface, to the service signal received by the receive port of the first device.

With reference to the second possible implementation manner of the second aspect of the present application, or with reference to the third possible implementation manner of the second aspect of the present application, or with reference to the fourth possible implementation manner of the second aspect of the present application, in a fifth possible implementation manner, if the determined second signal is an analog signal, where the analog signal is obtained by performing digital-to-analog conversion DAC and radio frequency processing on a signal sequence that is formed by at least one preset character and inserted between at least two segments of service data that are obtained by segmenting included service data, the estimation module is specifically configured to perform radio frequency processing and analog-to-digital conversion ADC on the determined analog signal to obtain a digital signal corresponding to the analog signal, and perform FFT on the digital signal corresponding to the analog signal to obtain the first frequency domain value.

With reference to the possible implementation manner of the second aspect of the present application, or with reference to the first possible implementation manner of the second aspect of the present application, or with reference to the second possible implementation manner of the second aspect of the present application, or with reference to the third possible implementation manner of the second aspect of the present application, or with reference to the fourth possible implementation manner of the second aspect of the present application, or with reference to the fifth possible implementation manner of the second aspect of the present application, in a sixth possible implementation manner, the signal sequence formed by at least one preset character is a signal sequence formed by all zeros.

According to a third aspect of the present application, a self-interference channel estimation device is provided, where the estimation device includes:

a signal receiver, configured to receive a first signal on a receive port of the first device, where the first signal includes a service signal that a second device sends to the first device, and includes a self-interference signal of interference that a second signal transmitted by a transmit port of the first device causes, through an air interface, to the service signal received by the receive port of the first device; and a processor, configured to: when the receive port of the first device receives the first signal, determine the second signal transmitted by the transmit port of the first device, where service data included by the second signal is segmented into at least two segments, and a signal sequence formed by at least one preset character is inserted between the at least two segments of service data; estimate, according to the first signal and the second signal, the self-interference signal of interference that the second signal transmitted by the transmit port of the first device causes, through the air interface, to the service signal received by the receive port of the first device; and eliminate the self-interference signal from the received first signal.

With reference to the possible implementation manner of the third aspect of the present application, in a first possible implementation manner, the processor is specifically configured to estimate, by using the first signal and the second signal, a channel value of a channel over which the second signal transmitted by the transmit port of the first device causes, through the air interface, interference to the service signal received by the receive port of the first device; and estimate, according to the channel value and the second signal, the self-interference signal of interference that the second signal transmitted by the transmit port of the first device causes, through the air interface, to the service signal received by the receive port of the first device.

With reference to the first possible implementation manner of the third aspect of the present application, in a second possible implementation manner, the processor is specifically configured to perform fast Fourier transform FFT on the determined second signal to obtain a first frequency domain value, perform time domain accumulation and frequency domain accumulation on a modular square of the first frequency domain value, and perform normalization processing on an accumulation result to obtain a first normalization result;

perform radio frequency processing and analog-to-digital conversion ADC on the received first signal to obtain a digital signal, and perform FFT on the digital signal to obtain a second frequency domain value;

multiply a conjugate of the first frequency domain value by the second frequency domain value, perform time domain accumulation and frequency domain accumulation on an obtained product, and perform normalization processing on an accumulation result to obtain a second normalization result; and estimate, according to the first normalization result and the second normalization result, the channel value of the channel over which the second signal transmitted by the transmit port of the first device causes, through the air interface, interference to the service signal received by the receive port of the first device.

With reference to the second possible implementation manner of the third aspect of the present application, in a third possible implementation manner, the processor is specifically configured to divide the second normalization result by the first normalization result, and consider an obtained quotient value as the estimated channel value of the channel over which the second signal transmitted by the transmit port of the first device causes, through the air interface, interference to the service signal received by the receive port of the first device.

With reference to the first possible implementation manner of the third aspect of the present application, or with reference to the second possible implementation manner of the third aspect of the present application, or with reference to the third possible implementation manner of the third aspect of the present application, in a fourth possible implementation manner, the processor is specifically configured to multiply the channel value by the first frequency domain value, perform inverse fast Fourier transform IFFT on an obtained product, and consider a transform result as the estimated self-interference signal of interference that the second signal transmitted by the transmit port of the first device causes, through the air interface, to the service signal received by the receive port of the first device.

With reference to the second possible implementation manner of the third aspect of the present application, or with reference to the third possible implementation manner of the third aspect of the present application, or with reference to the fourth possible implementation manner of the third aspect of the present application, in a fifth possible implementation manner, if the determined second signal is an analog signal, where the analog signal is obtained by performing digital-to-analog conversion DAC and radio frequency processing on a signal sequence that is formed by at least one preset character and inserted between at least two segments of service data that are obtained by segmenting included service data, the processor is specifically configured to perform radio frequency processing and analog-to-digital conversion ADC on the determined analog signal to obtain a digital signal corresponding to the analog signal, and perform FFT on the digital signal corresponding to the analog signal to obtain the first frequency domain value.

With reference to the possible implementation manner of the third aspect of the present application, or with reference to the first possible implementation manner of the third aspect of the present application, or with reference to the second possible implementation manner of the third aspect of the present application, or with reference to the third possible implementation manner of the third aspect of the present application, or with reference to the fourth possible implementation manner of the third aspect of the present application, or with reference to the fifth possible implementation manner of the third aspect of the present application, in a sixth possible implementation manner, the signal sequence formed by at least one preset character is a signal sequence formed by all zeros.

The present invention brings the following beneficial effects:

In the embodiments of the present application, when a receive port of a first device receives a first signal, the first device determines a second signal transmitted by a transmit port of the first device, where the first signal includes a service signal that a second device sends to the first device, and includes a self-interference signal of interference that the second signal transmitted by the transmit port of the first device causes, through an air interface, to the service signal received by the receive port of the first device, where service data included by the second signal is segmented into at least two segments, and a signal sequence formed by at least one preset character is inserted between the at least two segments of service data; estimates, according to the first signal and the second signal, the self-interference signal of interference that the second signal transmitted by the transmit port of the first device causes, through the air interface, to the service signal received by the receive port of the first device; and eliminates the self-interference signal from the received first signal. In this way, in the embodiments of the present application, by changing a data structure of the second signal synchronously transmitted by the transmit port of the first device, a quantity of times of time domain accumulation and frequency domain accumulation in a subsequent channel estimation process is indirectly adjusted, thereby reducing calculation complexity, effectively smoothing the service signal, and reducing impact of the service signal in self-interference channel estimation. Therefore, the self-interference signal of interference that the second signal transmitted by the transmit port of the first device causes, through the air interface, to the service signal received by the receive port of the first device can be precisely estimated, interference caused by the self-interference signal to the service signal received by the receive port is effectively suppressed, and system performance is improved.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show merely some embodiments of the present application, and persons of ordinary skill in the art may still derive other drawings from these accompanying drawings without creative efforts.

DESCRIPTION OF EMBODIMENTS

Figure 1:
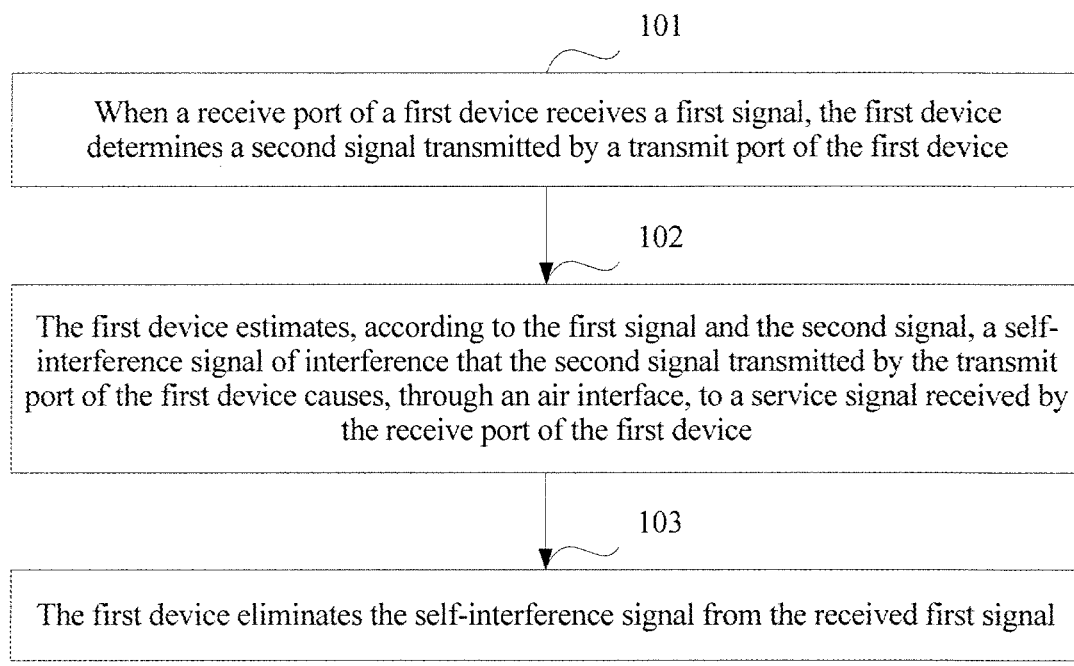
FIG. 1 is a schematic flowchart of a self-interference channel estimation method according to Embodiment 1 of the present application.

To achieve an objective of the present application, embodiments of the present application provide a self-interference channel estimation method and device, where the method includes: determining, by a first device when a receive port of the first device receives a first signal, a second signal transmitted by a transmit port of the first device, where the first signal includes a service signal that a second device sends to the first device, and includes a self-interference signal of interference that the second signal transmitted by the transmit port of the first device causes, through an air interface, to the service signal received by the receive port of the first device, where service data included by the second signal is segmented into at least two segments, and a signal sequence formed by at least one preset character is inserted between the at least two segments of service data; estimating, according to the first signal and the second signal, the self-interference signal of interference that the second signal transmitted by the transmit port of the first device causes, through the air interface, to the service signal received by the receive port of the first device; and eliminating the self-interference signal from the received first signal. In this way, in the embodiments of the present application, by changing a data structure of the second signal synchronously transmitted by the transmit port of the first device, a quantity of times of time domain accumulation and frequency domain accumulation in a subsequent channel estimation process is indirectly adjusted, thereby reducing calculation complexity, effectively smoothing the service signal, and reducing impact of the service signal in self-interference channel estimation. Therefore, the self-interference signal of interference that the second signal transmitted by the transmit port of the first device causes, through the air interface, to the service signal received by the receive port of the first device can be precisely estimated, interference caused by the self-interference signal to the service signal received by the receive port is effectively suppressed, and system performance is improved.

It should be noted that, the embodiments of the present application are applied to a co-frequency co-time full duplex system. A wireless device of the co-frequency co-time full duplex system includes a transmit port and a receive port, where the transmit port is used to send an uplink signal generated by the wireless device, and the receive port is used to receive a downlink signal that the wireless device needs.

The following further describes each embodiment of the present application in detail with reference to accompanying drawings in this specification. Apparently, the described embodiments are merely some but not all of the embodiments of the present application. All other embodiments obtained by persons of ordinary skill in the art based on the embodiments of the present application without creative efforts shall fall within the protection scope of the present application.

Embodiment 1

As shown in FIG. 1, FIG. 1 is a schematic flowchart of a self-interference channel estimation method according to Embodiment 1 of the present application. The method may be described as follows.

Step 101: When a receive port of a first device receives a first signal, the first device determines a second signal transmitted by a transmit port of the first device.

Service data included by the second signal is segmented into at least two segments, and a signal sequence formed by at least one preset character is inserted between the at least two segments of service data.

The first signal includes a service signal that a second device sends to the first device, and includes a self-interference signal of interference that the second signal transmitted by the transmit port of the first device causes, through an air interface, to the service signal received by the receive port of the first device.

In step 101, because the first device is a device that supports a co-frequency co-time full duplex technology, when the first device receives, by using the receive port of the first device, an uplink signal (that is, the service signal described in step 101) sent by an external device, the transmit port of the first device transmits a co-frequency co-time downlink signal (that is, the second signal described in step 101), and the downlink signal causes self-interference to the to-be-received uplink signal.

To subsequently facilitate suppressing for the self-interference that the downlink signal causes to the to-be-received uplink signal, when generating the downlink signal, the first device modifies a data structure of the downlink signal, that is, segments the service data included by the generated downlink signal into at least two segments, and inserts a signal sequence formed by at least one preset character between the at least two segments of service data.

It should be noted that, the signal sequence formed by at least one preset character may be set according to actual requirements, or may be an all-0 signal sequence. A quantity of preset characters in the signal sequence may be determined according to actual requirements, which is not limited herein.

For example, if the quantity of preset characters in the signal sequence is 0, a quantity of 0s is selected according to a system performance requirement and/or channel quality. Generally, poorer channel quality and a higher performance requirement indicate a larger quantity of 0s.

For example, on a self-interference channel that changes slowly, 32 0s need to be inserted into a downlink signal that includes 4098 digital signals, where the self-interference channel that changes slowly refers to a channel whose channel state changes relatively slow.

Figure 2:
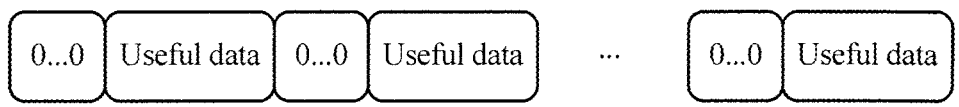
FIG. 2 is a schematic structural diagram of a second signal formed after an all-0 signal sequence is inserted into a downlink signal.
Figure 3:
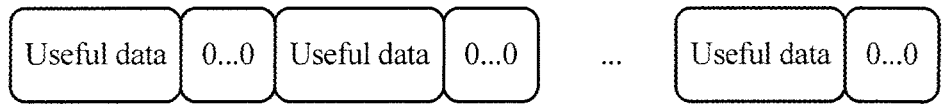
FIG. 3 is a schematic structural diagram of a second signal formed after an all-0 signal sequence is inserted into a downlink signal.

As shown in FIG. 2 and FIG. 3, FIG. 2 and FIG. 3 are schematic structural diagrams of a second signal formed after an all-0 signal sequence is inserted into a downlink signal.

Optionally, the second signal may further be an analog signal, where the analog signal is obtained by performing digital-to-analog conversion (DAC) and radio frequency processing on the signal sequence that is formed by at least one preset character and inserted between the at least two segments of service data that are obtained by segmenting the included service data.

A manner in which when the receive port of the first device receives the first signal sent by the second device, the first device determines the second signal transmitted by the transmit port of the first device may be as follows: When the receive port of the first device receives the first signal sent by the second device, by using an internal mechanism of the first device, the second signal transmitted by the transmit port of the first device is fed back to a channel estimation processor in the first device.

Step 102: The first device estimates, according to the first signal and the second signal, a self-interference signal of interference that the second signal transmitted by the transmit port of the first device causes, through an air interface, to a service signal received by the receive port of the first device.

In step 102, first, the first device estimates, by using the first signal and the second signal, a channel value of a channel over which the second signal transmitted by the transmit port of the first device causes, through the air interface, interference to the service signal received by the receive port of the first device.

Specifically, because the second signal may be an analog signal or may be a digital signal, there is a difference in a manner of estimating the channel value of the channel over which the second signal transmitted by the transmit port of the first device causes, through the air interface, interference to the service signal received by the receive port of the first device.

It is assumed that the second signal is a digital signal, the included service data is segmented into at least two segments, and a signal sequence formed by at least one preset character is inserted between the at least two segments of service data; the estimating the channel value of the channel over which the second signal transmitted by the transmit port of the first device causes, through the air interface, interference to the service signal received by the receive port of the first device is as follows.

Figure 4:
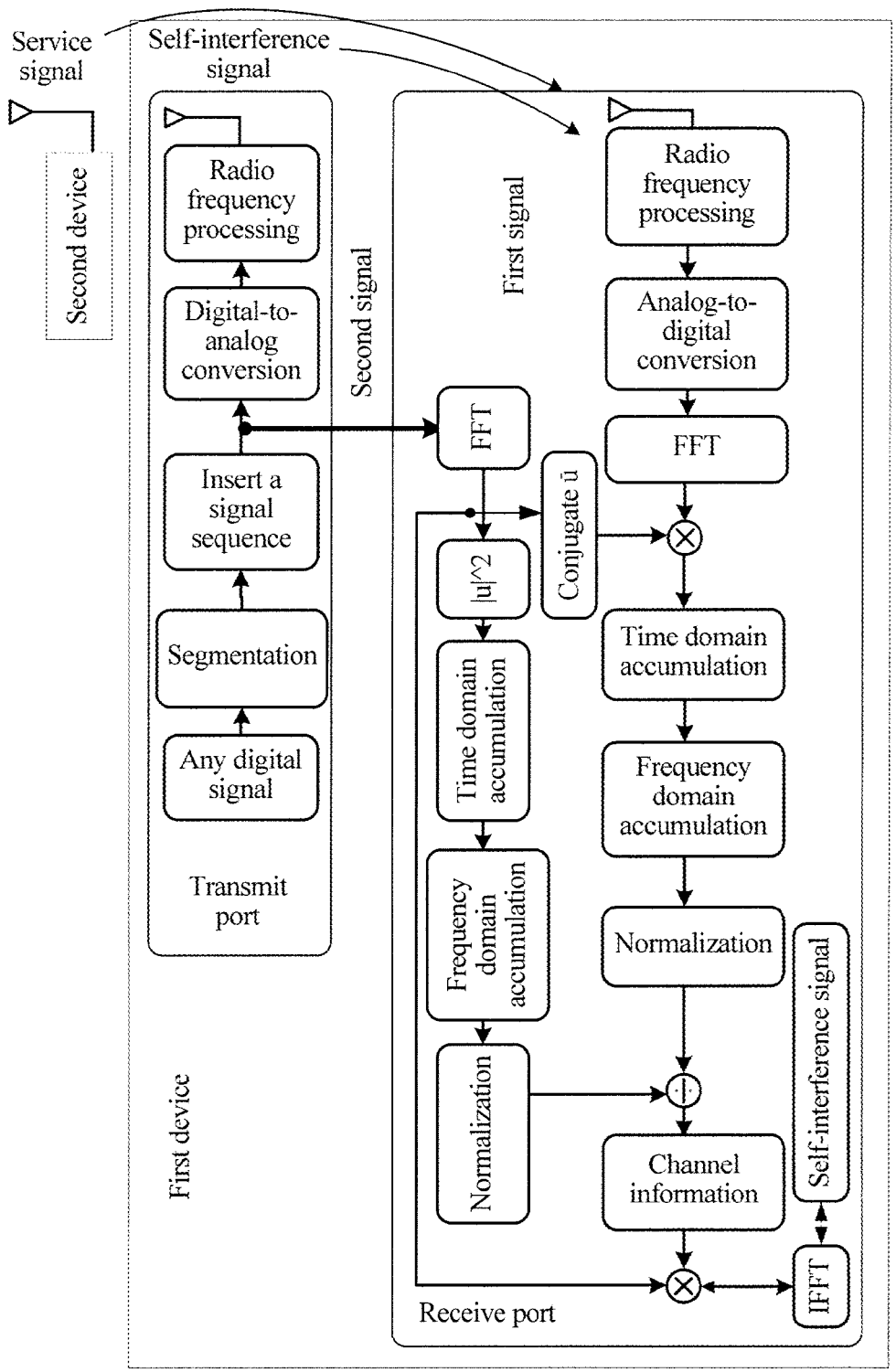
FIG. 4 is a schematic diagram of channel estimation.

As shown in FIG. 4, FIG. 4 is a schematic structural diagram of channel estimation.

Step 1: Perform fast Fourier transform (FFT) on the determined second signal to obtain a first frequency domain value.

Specifically, FFT may be performed on the acquired second signal in the following manner to obtain the first frequency domain value:

$$Y1 = X1_i,$$

where Y1 indicates the first frequency domain value, $X1_i$ is an $i^{th}$ frequency domain value of the second signal, and i is a natural number greater than 0 and less than N, where N is a natural number.

Step 2: Perform time domain accumulation and frequency domain accumulation on a modular square of the first frequency domain value, and perform normalization processing on an accumulation result to obtain a first normalization result.

Specifically, time domain accumulation and frequency domain accumulation are separately performed on the obtained first frequency domain value.

The time domain accumulation herein means accumulating, by time, a frequency domain value obtained by calculation; and the frequency domain accumulation herein means accumulating, by frequency, a time domain value or a frequency domain value obtained by calculation.

Step 3: Perform radio frequency processing and analog-to-digital conversion ADC on the received first signal to obtain a digital signal.

Step 4: Perform FFT on the digital signal to obtain a second frequency domain value.

Specifically, FFT is performed on the digital signal in the following manner to obtain the second frequency domain value:

$$Y2 = H \cdot X1_i + S_i, \quad i = 1, 2, \ldots, N,$$

where $Y2_i$ indicates the second frequency domain value, H indicates a channel matrix of the channel over which the second signal transmitted by the transmit port of the first device causes, through the air interface, interference to the service signal received by the receive port of the first device, $X1_i$ indicates an $i^{th}$ frequency domain value of the second signal, i is a natural number greater than 0 and less than N, where N is a natural number, and $S_i$ is a frequency domain value of an $i^{th}$ signal of the first signal.

Step 5: Multiply a conjugate of the first frequency domain value by the second frequency domain value, perform time domain accumulation and frequency domain accumulation on an obtained product, and perform normalization processing on an accumulation result to obtain a second normalization result.

Step 6: Estimate, according to the first normalization result and the second normalization result, the channel value of the channel over which the second signal transmitted by the transmit port of the first device causes, through the air interface, interference to the service signal received by the receive port of the first device.

Specifically, the first normalization result is divided by the second normalization result, and an obtained quotient value is considered as the estimated channel value of the channel over which the second signal transmitted by the transmit port of the first device causes, through the air interface, interference to the service signal received by the receive port of the first device.

Specifically, the channel value of the channel over which the second signal transmitted by the transmit port of the first device causes, through the air interface, interference to the service signal received by the receive port of the first device is estimated in the following manner:

$$\hat{H} = \frac{1}{N} \sum_{i=1}^{N} \frac{Y3_i}{Y4_i} = H + \frac{1}{N} \sum_{i=1}^{N} conj(X1_i) \cdot S_i,$$

where $\hat{H}$ indicates the estimated channel value of the channel over which the second signal transmitted by the transmit port of the first device causes, through the air interface, interference to the service signal received by the receive port of the first device; H indicates the channel matrix of the channel over which the second signal transmitted by the transmit port of the first device causes, through the air interface, interference to the service signal received by the receive port of the first device; $Y3_i = H|X1_i|^2 + conj(X1_i) \cdot S_i$ indicates an product obtained by multiplying the conjugate of the first frequency domain value by the second frequency domain value; $conj(X1_i)$ indicates obtaining a conjugate of an $i^{th}$ frequency domain value of the second signal; $|X1_i|^2$ indicates a modular square of the $i^{th}$ frequency domain value of the second signal; $Y4_i = |X1_i|^2$ indicates an $i^{th}$ modular square value; and $S_i$ indicates an $i^{th}$ frequency domain value of the first signal.

It is assumed that the second signal is an analog signal, and the estimating the channel value of the channel over which the second signal transmitted by the transmit port of the first device causes, through the air interface, interference to the service signal received by the receive port of the first device is as follows.

Figure 5:
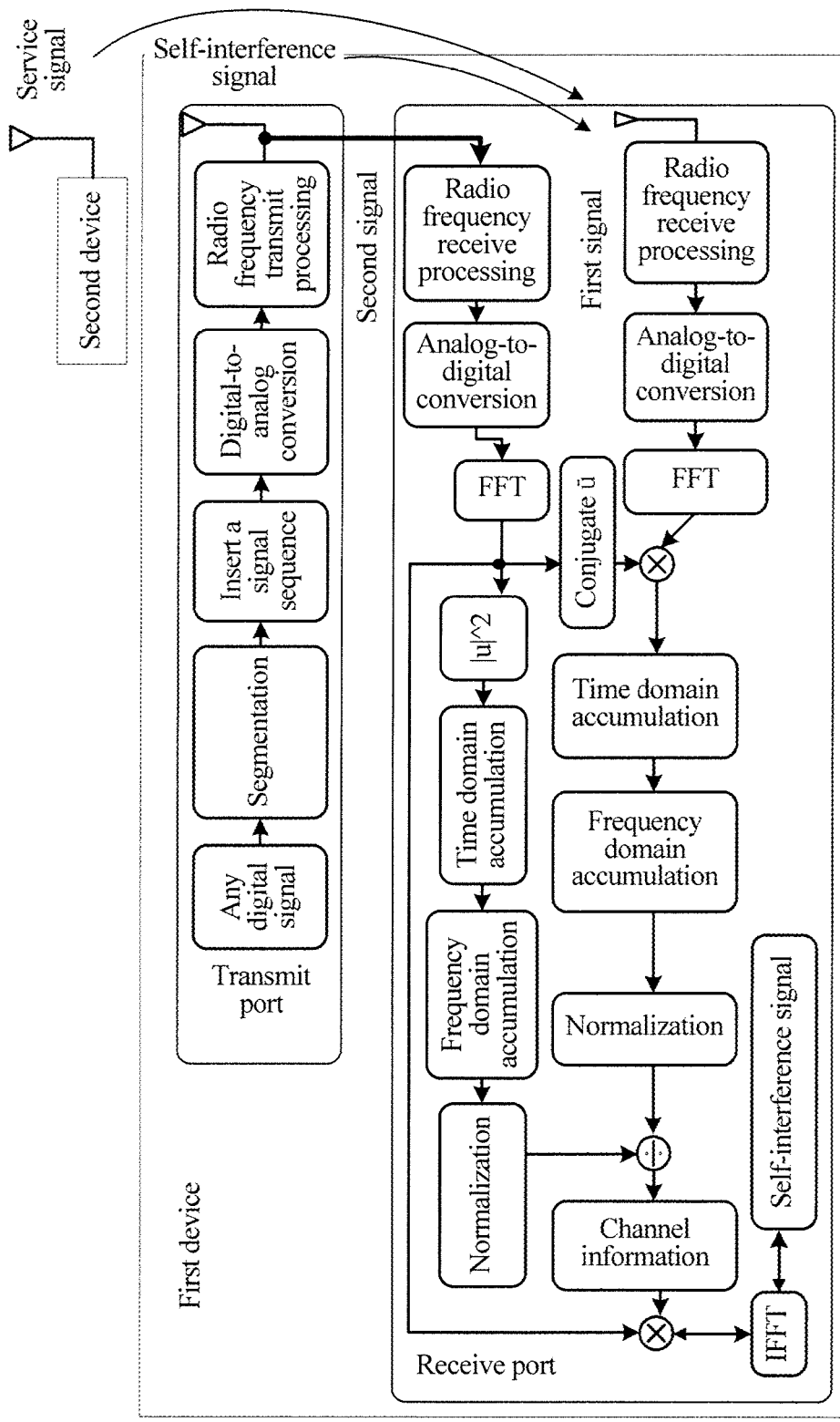
FIG. 5 is a schematic diagram of channel estimation.

As shown in FIG. 5, FIG. 5 is a schematic structural diagram of channel estimation.

Step 1: Perform radio frequency processing and analog-to-digital conversion ADC on the determined analog signal to obtain a digital signal corresponding to the analog signal.

Step 2: Perform FFT on the digital signal corresponding to the analog signal to obtain a first frequency domain value.

Step 3: Perform time domain accumulation and frequency domain accumulation on a modular square of the first frequency domain value, and perform normalization processing on an accumulation result to obtain a first normalization result.

Specifically, time domain accumulation and frequency domain accumulation are separately performed on the obtained first frequency domain value.

The time domain accumulation herein means accumulating, by time, a frequency domain value obtained by calculation; and the frequency domain accumulation herein means accumulating, by frequency, a time domain value or a frequency domain value obtained by calculation.

Step 4: Perform radio frequency processing and analog-to-digital conversion ADC on the received first signal that is interfered by the second signal, so as to obtain a digital signal.

Step 5: Perform FFT on the digital signal to obtain a second frequency domain value.

Step 6: Multiply a conjugate of the first frequency domain value by the second frequency domain value, perform time domain accumulation and frequency domain accumulation on an obtained product, and perform normalization processing on an accumulation result to obtain a second normalization result.

Step 7: Estimate, according to the first normalization result and the second normalization result, the channel value of the channel over which the second signal transmitted by the transmit port of the first device causes, through the air interface, interference to the service signal received by the receive port of the first device.

Optionally, in step 101, it is assumed that the first device has not modified the data structure of the downlink signal transmitted by the transmit port; then, the manner in which when the receive port of the first device receives the first signal sent by the second device, the first device determines the second signal transmitted by the transmit port of the first device may be further as follows.

The first device determines, according to an arrival time of the first signal sent by the second device and a delay time of determining the second signal transmitted by the transmit port of the first device, a time difference between a time of receiving the first signal sent by the second device and a time of determining the second signal transmitted by the transmit port of the first device; and uses the time difference to receive the first signal sent by the second device and to determine the second signal transmitted by the transmit port of the first device.

In this way, in step 102, the estimating, by using the first signal and the second signal, the channel value of the channel over which the second signal transmitted by the transmit port of the first device causes, through the air interface, interference to the service signal received by the receive port of the first device may further include the following.

Figure 6:
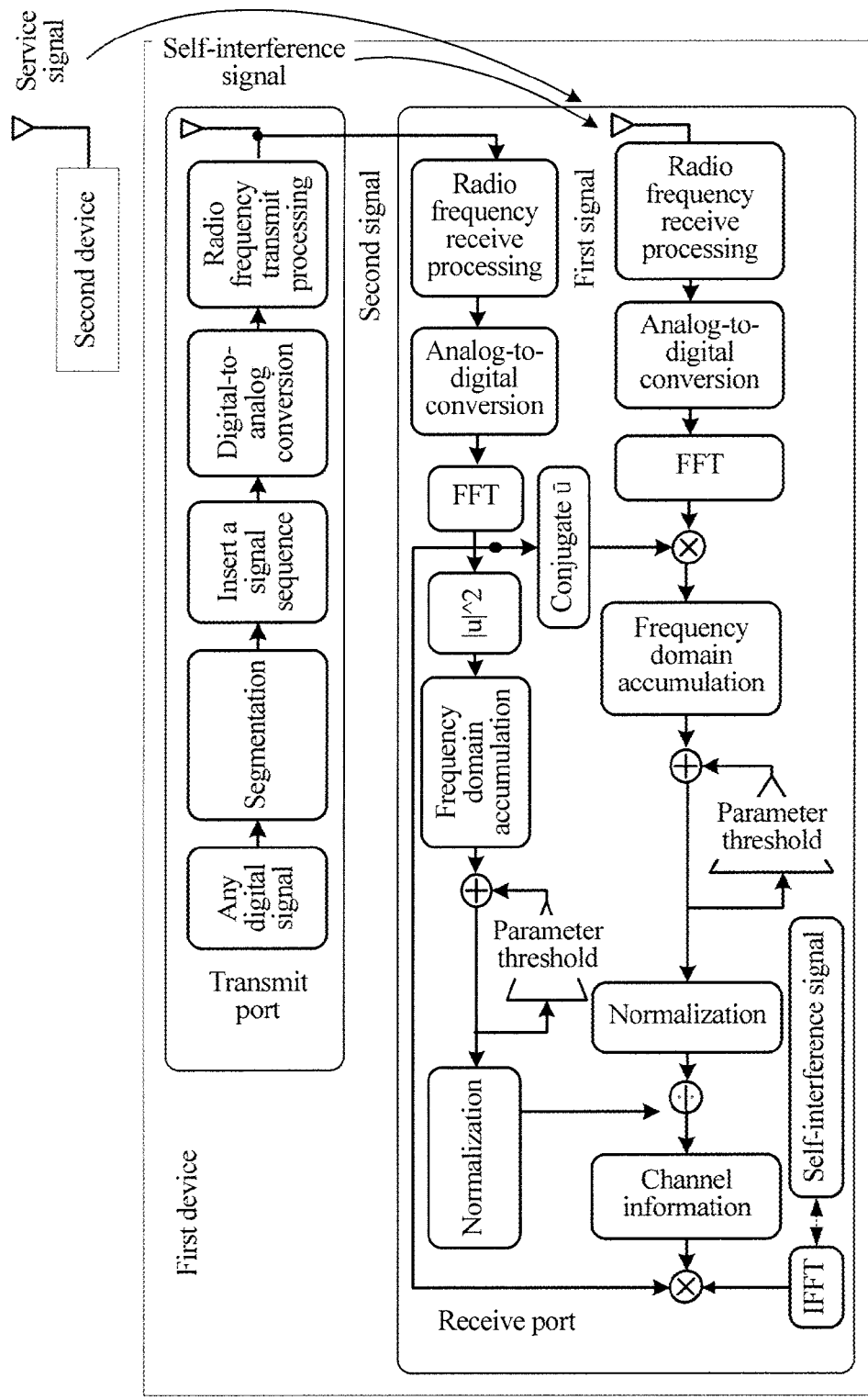
FIG. 6 is a schematic diagram of channel estimation.

As shown in FIG. 6, FIG. 6 is a schematic structural diagram of channel estimation.

Step 1: When the first signal interfered by the second signal is received, eliminate a time difference between a time of receiving the first signal interfered by the second signal and a time of determining the second signal transmitted by the transmit port of the first device.

Step 2: Perform radio frequency processing and analog-to-digital conversion ADC on the determined analog signal to obtain a digital signal corresponding to the analog signal.

Step 3: Perform FFT on the digital signal corresponding to the analog signal to obtain a first frequency domain value.

Step 4: Perform frequency domain accumulation on a modular square of the first frequency domain value, use a parameter threshold to adjust an accumulation result obtained by calculation, and perform normalization processing on an adjustment result to obtain a first normalization result.

The parameter threshold has an initial value, but may be adjusted in actual use according to a change of a self-interference channel and a transmit power of the first signal.

For example, when the self-interference channel changes relatively slow, and the transmit power of the first signal is relatively high, in this case, a specified parameter threshold is increased.

Step 5: Perform radio frequency processing and analog-to-digital conversion ADC on the received first signal that is interfered by the second signal, so as to obtain a digital signal.

Step 6: Perform FFT on the digital signal to obtain a second frequency domain value.

Step 7: Multiply a conjugate of the first frequency domain value by the second frequency domain value, perform frequency domain accumulation on an obtained product, use the parameter threshold to adjust an accumulation result obtained by calculation, and perform normalization processing on an adjustment result to obtain a second normalization result.

Step 8: Estimate, according to the first normalization result and the second normalization result, the channel value of the channel over which the second signal transmitted by the transmit port of the first device causes, through the air interface, interference to the service signal received by the receive port of the first device.

Then, the self-interference signal of interference that the second signal transmitted by the transmit port of the first device causes, through the air interface, to the service signal received by the receive port of the first device is estimated according to the channel value and the second signal.

Specifically, the channel value is multiplied by the first frequency domain value, inverse fast Fourier transform IFFT is performed on an obtained product, and a transform result is considered as the estimated self-interference signal of interference that the second signal transmitted by the transmit port of the first device causes, through the air interface, to the service signal received by the receive port of the first device.

Step 103: The first device eliminates the self-interference signal from the received first signal.

It should be noted that, the "first" and "second" described in Embodiment 1 of the present application are merely used for differentiation.

The first device and the second device may be base station devices, relay devices, or terminal devices that have a receiving and sending function, which is not limited herein.

According to the solution of Embodiment 1 of the present application, when a receive port of a first device receives a first signal, the first device determines a second signal transmitted by a transmit port of the first device, where the first signal includes a service signal that a second device sends to the first device, and includes a self-interference signal of interference that the second signal transmitted by the transmit port of the first device causes, through an air interface, to the service signal received by the receive port of the first device, where service data included by the second signal is segmented into at least two segments, and a signal sequence formed by at least one preset character is inserted between the at least two segments of service data; estimates, according to the first signal and the second signal, the self-interference signal of interference that the second signal transmitted by the transmit port of the first device causes, through the air interface, to the service signal received by the receive port of the first device; and eliminates the self-interference signal from the received first signal. In this way, in this embodiment of the present application, by changing a data structure of the second signal synchronously transmitted by the transmit port of the first device, a quantity of times of time domain accumulation and frequency domain accumulation in a subsequent channel estimation process is indirectly adjusted, thereby reducing calculation complexity, effectively smoothing the service signal, and reducing impact of the service signal in self-interference channel estimation. Therefore, the self-interference signal of interference that the second signal transmitted by the transmit port of the first device causes, through the air interface, to the service signal received by the receive port of the first device can be precisely estimated, interference caused by the self-interference signal to the service signal received by the receive port is effectively suppressed, and system performance is improved.

Embodiment 2

Figure 7:
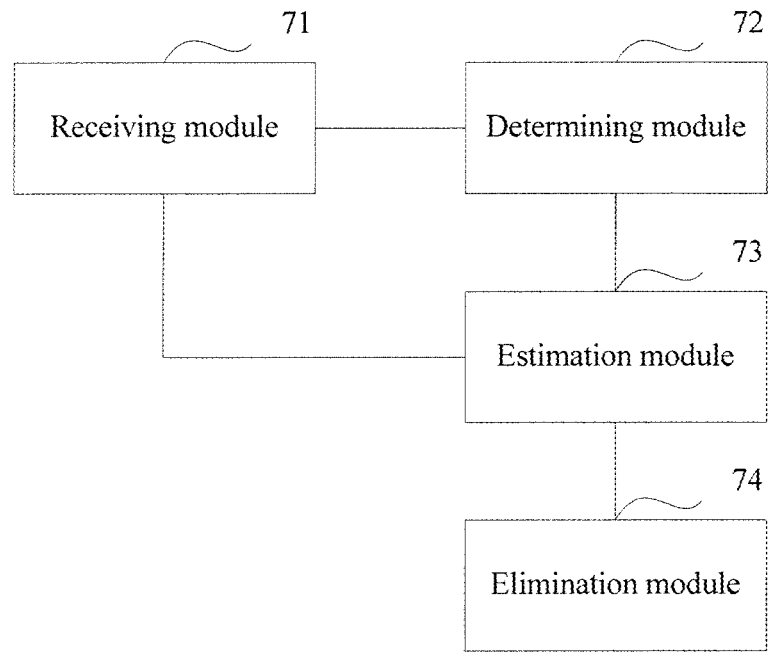
FIG. 7 is a schematic structural diagram of a self-interference channel estimation device according to Embodiment 2 of the present application.

As shown in FIG. 7, FIG. 7 is a schematic structural diagram of a self-interference channel estimation device according to Embodiment 2 of the present application. The estimation device includes: a receiving module 71, a determining module 72, an estimation module 73, and an elimination module 74.

The receiving module 71 is configured to receive a first signal on a receive port of the first device, where the first signal includes a service signal that a second device sends to the first device, and includes a self-interference signal of interference that a second signal transmitted by a transmit port of the first device causes, through an air interface, to the service signal received by the receive port of the first device;

the determining module 72 is configured to: when the receiving module 71 receives the first signal, determine the second signal transmitted by the transmit port of the first device, where service data included by the second signal is segmented into at least two segments, and a signal sequence formed by at least one preset character is inserted between the at least two segments of service data;

the estimation module 73 is configured to estimate, according to the first signal received by the receiving module 71 and the second signal determined by the determining module 72, the self-interference signal of interference that the second signal transmitted by the transmit port of the first device causes, through the air interface, to the service signal received by the receive port of the first device; and the elimination module 74 is configured to eliminate the self-interference signal from the received first signal.

Specifically, the estimation module 73 is specifically configured to estimate, by using the first signal and the second signal, a channel value of a channel over which the second signal transmitted by the transmit port of the first device causes, through the air interface, interference to the service signal received by the receive port of the first device; and estimate, according to the channel value and the second signal, the self-interference signal of interference that the second signal transmitted by the transmit port of the first device causes, through the air interface, to the service signal received by the receive port of the first device.

Specifically, the estimation module 73 is specifically configured to perform fast Fourier transform FFT on the determined second signal to obtain a first frequency domain value, perform time domain accumulation and frequency domain accumulation on a modular square of the first frequency domain value, and perform normalization processing on an accumulation result to obtain a first normalization result;

perform radio frequency processing and analog-to-digital conversion ADC on the received first signal to obtain a digital signal, and perform FFT on the digital signal to obtain a second frequency domain value;

multiply a conjugate of the first frequency domain value by the second frequency domain value, perform time domain accumulation and frequency domain accumulation on an obtained product, and perform normalization processing on an accumulation result to obtain a second normalization result; and estimate, according to the first normalization result and the second normalization result, the channel value of the channel over which the second signal transmitted by the transmit port of the first device causes, through the air interface, interference to the service signal received by the receive port of the first device.

Specifically, the estimation module 73 is specifically configured to divide the first normalization result by the second normalization result, and consider an obtained quotient value as the estimated channel value of the channel over which the second signal transmitted by the transmit port of the first device causes, through the air interface, interference to the service signal received by the receive port of the first device.

Specifically, the estimation module 73 is specifically configured to multiply the channel value by the first frequency domain value, perform inverse fast Fourier transform IFFT on an obtained product, and consider a transform result as the estimated self-interference signal of interference that the second signal transmitted by the transmit port of the first device causes, through the air interface, to the service signal received by the receive port of the first device.

Optionally, if the determined second signal is an analog signal, where the analog signal is obtained by performing digital-to-analog conversion DAC and radio frequency processing on a signal sequence that is formed by at least one preset character and inserted between at least two segments of service data that are obtained by segmenting included service data, the estimation module 73 is specifically configured to perform radio frequency processing and analog-to-digital conversion ADC on the determined analog signal to obtain a digital signal corresponding to the analog signal, and perform FFT on the digital signal corresponding to the analog signal to obtain the first frequency domain value.

Optionally, the signal sequence formed by at least one preset character is a signal sequence formed by all zeros.

It should be noted that, the estimation device described in Embodiment 2 of the present application may be integrated into a device that has a receiving and sending capability, such as a base station device, a terminal device, or a relay device, which is not limited herein.

Embodiment 3

Figure 8:
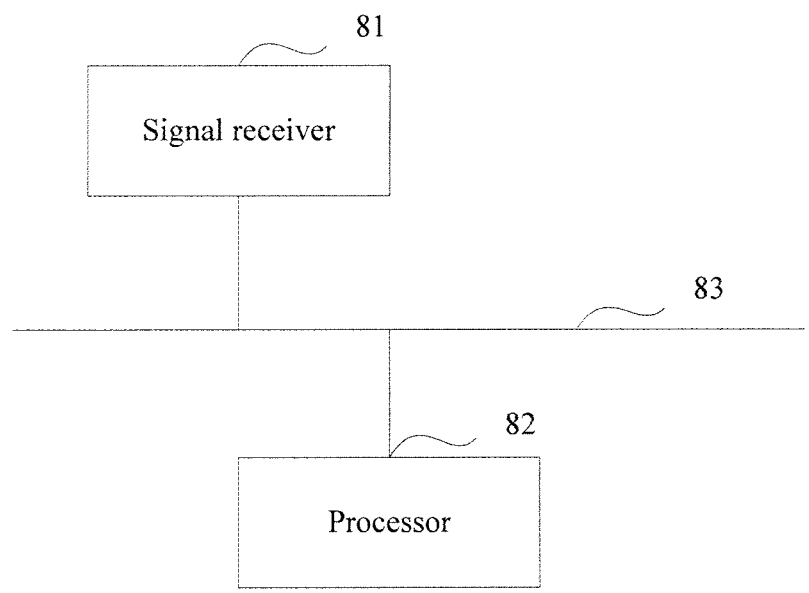
FIG. 8 is a schematic structural diagram of a self-interference channel estimation device according to Embodiment 3 of the present application.

As shown in FIG. 8, FIG. 8 is a schematic structural diagram of a self-interference channel estimation device according to Embodiment 3 of the present application. The estimation device has an estimation function described in Embodiment 1 of the present application. The estimation device may use a general computer system structure, where the computer system may be specifically a processor-based computer. The estimation device entity includes a signal receiver 81 and at least one processor 82, and the signal receiver 81 connects to the at least one processor 82 by using a communications bus 83.

The processor 82 may be a general-purpose central processing unit (CPU), a microprocessor, an application-specific integrated circuit (ASIC), or one or more integrated circuits configured to control program execution in the solution of the present application.

The signal receiver 81 is configured to receive a first signal on a receive port of the first device, where the first signal includes a service signal that a second device sends to the first device, and includes a self-interference signal of interference that a second signal transmitted by a transmit port of the first device causes, through an air interface, to the service signal received by the receive port of the first device.

The processor 82 is configured to: when the receive port of the first device receives the first signal, determine the second signal transmitted by the transmit port of the first device, where service data included by the second signal is segmented into at least two segments, and a signal sequence formed by at least one preset character is inserted between the at least two segments of service data; estimate, according to the first signal and the second signal, the self-interference signal of interference that the second signal transmitted by the transmit port of the first device causes, through the air interface, to the service signal received by the receive port of the first device; and eliminate the self-interference signal from the received first signal.

Specifically, the processor 82 is specifically configured to estimate, by using the first signal and the second signal, a channel value of a channel over which the second signal transmitted by the transmit port of the first device causes, through the air interface, interference to the service signal received by the receive port of the first device; and estimate, according to the channel value and the second signal, the self-interference signal of interference that the second signal transmitted by the transmit port of the first device causes, through the air interface, to the service signal received by the receive port of the first device.

Specifically, the processor 82 is specifically configured to perform fast Fourier transform FFT on the determined second signal to obtain a first frequency domain value, perform time domain accumulation and frequency domain accumulation on a modular square of the first frequency domain value, and perform normalization processing on an accumulation result to obtain a first normalization result;

perform radio frequency processing and analog-to-digital conversion ADC on the received first signal to obtain a digital signal, and perform FFT on the digital signal to obtain a second frequency domain value;

multiply a conjugate of the first frequency domain value by the second frequency domain value, perform time domain accumulation and frequency domain accumulation on an obtained product, and perform normalization processing on an accumulation result to obtain a second normalization result; and estimate, according to the first normalization result and the second normalization result, the channel value of the channel over which the second signal transmitted by the transmit port of the first device causes, through the air interface, interference to the service signal received by the receive port of the first device.

Specifically, the processor 82 is specifically configured to divide the first normalization result by the second normalization result, and consider an obtained quotient value as the estimated channel value of the channel over which the second signal transmitted by the transmit port of the first device causes, through the air interface, interference to the service signal received by the receive port of the first device.

Specifically, the processor 82 is specifically configured to multiply the channel value by the first frequency domain value, perform inverse fast Fourier transform IFFT on an obtained product, and consider a transform result as the estimated self-interference signal of interference that the second signal transmitted by the transmit port of the first device causes, through the air interface, to the service signal received by the receive port of the first device.

Optionally, if the determined second signal is an analog signal, where the analog signal is obtained by performing digital-to-analog conversion DAC and radio frequency processing on a signal sequence that is formed by at least one preset character and inserted between at least two segments of service data that are obtained by segmenting included service data, the processor 82 is specifically configured to: perform radio frequency processing and analog-to-digital conversion ADC on the determined analog signal to obtain a digital signal corresponding to the analog signal, and perform FFT on the digital signal corresponding to the analog signal to obtain the first frequency domain value.

Specifically, the signal sequence formed by at least one preset character is a signal sequence formed by all zeros.

In this embodiment of the present application, by changing a data structure of a second signal synchronously transmitted by a transmit port of a first device, a quantity of times of time domain accumulation and frequency domain accumulation in a subsequent channel estimation process is indirectly adjusted, thereby reducing calculation complexity, effectively smoothing a service signal, and reducing impact of the service signal in self-interference channel estimation. Therefore, a self-interference signal of interference that the second signal transmitted by the transmit port of the first device causes, through an air interface, to the service signal received by a receive port of the first device can be precisely estimated, interference caused by the self-interference signal to the service signal received by the receive port is effectively suppressed, and system performance is improved.

Embodiment 4

Figure 9:
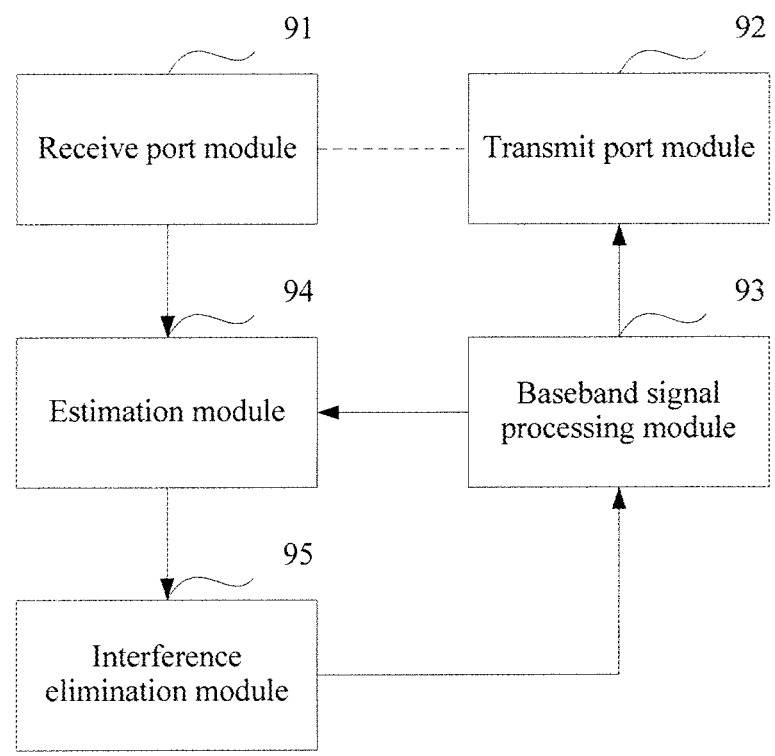
FIG. 9 is a schematic structural diagram of a device according to Embodiment 4 of the present application.

As shown in FIG. 9, FIG. 9 is a schematic structural diagram of a device according to Embodiment 4 of the present application. The device includes a receive port module 91, a transmit port module 92, a baseband signal processing module 93, an estimation module 94, and an interference elimination module 95.

The receive port module 91 is configured to receive a first signal, where the first signal includes a service signal that a second device sends to the first device, and includes a self-interference signal of interference that a second signal transmitted by the transmit port module 92 of the first device causes, through an air interface, to the service signal received by the receive port module 91 of the first device, and send the received first signal to the estimation module 94;

the transmit port module 92 is configured to transmit the second signal generated by the baseband signal processing module 93;

the baseband signal processing module 93 is configured to send the generated second signal to the estimation module 94;

the estimation module 94 is configured to estimate, according to the first signal and the second signal, the self-interference signal of interference that the second signal transmitted by the transmit port of the first device causes, through the air interface, to the service signal received by the receive port of the first device; and the interference elimination module 95 is configured to eliminate the self-interference signal from the received first signal.

Specifically, the estimation module 94 is specifically configured to estimate, by using the first signal and the second signal, a channel value of a channel over which the second signal transmitted by the transmit port of the first device causes, through the air interface, interference to the service signal received by the receive port of the first device; and estimate, according to the channel value and the second signal, the self-interference signal of interference that the second signal transmitted by the transmit port of the first device causes, through the air interface, to the service signal received by the receive port of the first device.

Specifically, the estimation module 94 is specifically configured to perform fast Fourier transform FFT on the determined second signal to obtain a first frequency domain value, perform time domain accumulation and frequency domain accumulation on a modular square of the first frequency domain value, and perform normalization processing on an accumulation result to obtain a first normalization result;

perform radio frequency processing and analog-to-digital conversion ADC on the received first signal to obtain a digital signal, and perform FFT on the digital signal to obtain a second frequency domain value;

multiply a conjugate of the first frequency domain value by the second frequency domain value, perform time domain accumulation and frequency domain accumulation on an obtained product, and perform normalization processing on an accumulation result to obtain a second normalization result; and estimate, according to the first normalization result and the second normalization result, the channel value of the channel over which the second signal transmitted by the transmit port of the first device causes, through the air interface, interference to the service signal received by the receive port of the first device.

Specifically, the estimation module 94 is specifically configured to divide the first normalization result by the second normalization result, and consider an obtained quotient value as the estimated channel value of the channel over which the second signal transmitted by the transmit port of the first device causes, through the air interface, interference to the service signal received by the receive port of the first device.

Specifically, the estimation module 94 is specifically configured to multiply the channel value by the first frequency domain value, perform inverse fast Fourier transform IFFT on an obtained product, and consider a transform result as the estimated self-interference signal of interference that the second signal transmitted by the transmit port of the first device causes, through the air interface, to the service signal received by the receive port of the first device.

Optionally, if the determined second signal is an analog signal, where the analog signal is obtained by performing digital-to-analog conversion DAC and radio frequency processing on a signal sequence that is formed by at least one preset character and inserted between at least two segments of service data that are obtained by segmenting included service data, the estimation module 94 is specifically configured to perform radio frequency processing and analog-to-digital conversion ADC on the determined analog signal to obtain a digital signal corresponding to the analog signal, and perform FFT on the digital signal corresponding to the analog signal to obtain the first frequency domain value.

Specifically, the signal sequence formed by at least one preset character is a signal sequence formed by all zeros.

It should be noted that, the device may be a device that has a receiving and sending capability, such as a base station device, a terminal device, or a relay device.

Persons skilled in the art should understand that the embodiments of the present application may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the apparatus (device), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present application have been described, persons skilled in the art can make changes and modifications to these embodiments once they learn the basic inventive concept. Therefore, the following claims are intended to be construed as to cover the exemplary embodiments and all changes and modifications falling within the scope of the present application.

Obviously, persons skilled in the art can make various modifications and variations to the present invention without departing from the spirit and scope of the present application. The present invention is intended to cover these modifications and variations provided that they fall within the scope of protection defined by the following claims and their equivalent technologies.

What is claimed is:

1. A self-interference channel estimation method, comprising:
    determining, by a first device when a receive port of the first device receives a first signal, a second signal transmitted by a transmit port of the first device, wherein the first signal comprises a service signal from a second device, and comprises a self-interference signal originated from the second signal which interfering, through an air interface, with the service signal from the second device, wherein service data comprised in the second signal is segmented into at least two segments, and a signal sequence formed by at least one preset character is inserted between the at least two segments of service data;
    estimating, by the first device according to the first signal and the second signal, the self-interference signal originated from the second signal, wherein the estimating the self-interference signal originated from the second signal comprises:
        estimating, by using the first signal and the second signal, a channel value of a channel over which the second signal transmitted by the transmit port of the first device causes, through the air interface, interference to the service signal received by the receive port of the first device; and
        estimating, according to the channel value and the second signal, the self-interference signal of interference that the second signal transmitted by the transmit port of the first device causes, through the air interface, to the service signal received by the receive port of the first device; and
    eliminating, by the first device, the estimated self-interference signal from the received first signal, wherein the estimating, by using the first signal and the second signal, a channel value of a channel over which the second signal transmitted by the transmit port of the first device causes, through the air interface, interference to the service signal received by the receive port of the first device comprises:
    performing fast Fourier transform (FFT) on the determined second signal to obtain a first frequency domain value;
    performing time domain accumulation and frequency domain accumulation on a modular square of the first frequency domain value, and performing normalization processing on an accumulation result to obtain a first normalization result;
    performing radio frequency processing and analog-to-digital conversion (ADC) on the received first signal to obtain a digital signal;
    performing FFT on the digital signal to obtain a second frequency domain value;
    multiplying a conjugate of the first frequency domain value by the second frequency domain value, performing time domain accumulation and frequency domain accumulation on an obtained product, and performing normalization processing on an accumulation result to obtain a second normalization result; and
    estimating, according to the first normalization result and the second normalization result, the channel value of the channel over which the second signal transmitted by the transmit port of the first device causes, through the air interface, interference to the service signal received by the receive port of the first device.

2. The method according to claim 1, wherein the estimating, according to the first normalization result and the second normalization result, the channel value of the channel over which the second signal transmitted by the transmit port of the first device causes, through the air interface, interference to the service signal received by the receive port of the first device comprises:
    dividing the second normalization result by the first normalization result, and considering an obtained quotient value as the estimated channel value of the channel over which the second signal transmitted by the transmit port of the first device causes, through the air interface, interference to the service signal received by the receive port of the first device.

3. The method according to claim 1, wherein the estimating, according to the channel value and the second signal, the self-interference signal of interference that the second signal transmitted by the transmit port of the first device causes, through the air interface, to the service signal received by the receive port of the first device comprises:
    multiplying the channel value by the first frequency domain value, performing inverse fast Fourier transform (IFFT) on an obtained product, and considering a transform result as the self-interference signal of interference that the second signal transmitted by the transmit port of the first device causes, through the air interface, to the service signal received by the receive port of the first device.

4. The method according to claim 1, wherein if the determined second signal is an analog signal, wherein the analog signal is obtained by performing digital-to-analog conversion (DAC) and radio frequency processing on a signal sequence that is formed by at least one preset character and inserted between at least two segments of service data that are obtained by segmenting comprised service data, the performing FFT on the determined second signal to obtain a first frequency domain value comprises:
    performing radio frequency processing and analog-to-digital conversion (ADC) on the determined analog signal to obtain a digital signal corresponding to the analog signal, and performing FFT on the digital signal corresponding to the analog signal to obtain the first frequency domain value.

5. The method according to claim 1, wherein the signal sequence formed by at least one preset character is a signal sequence formed by all zeros.

6. A self-interference channel estimation device, comprising:
    a receiver, configured to receive a first signal on a receive port of the first device, wherein the first signal comprises a service signal from a second device, and comprises a self-interference signal originated from a second signal transmitted by a transmit port of the first device, and the self-interference signal interferes with the service signal from the second device;

a processor, configured to:
   determine the second signal transmitted by the transmit port of the first device when the receiver receives the first signal, wherein service data comprised by the second signal is segmented into at least two segments, and a signal sequence formed by at least one preset character is inserted between the at least two segments of service data;
   estimate, according to the first signal and the second signal, the self-interference signal originated from the second signal;
   eliminate the estimated self-interference signal from the received first signal;
   estimate, by using the first signal and the second signal, a channel value of a channel over which the second signal transmitted by the transmit port of the first device causes, through the air interface, interference to the service signal received by the receive port of the first device;
   estimate, according to the channel value and the second signal, the self-interference signal of interference that the second signal transmitted by the transmit port of the first device causes, through the air interface, to the service signal received by the receive port of the first device;
   perform fast Fourier transform (FFT) on the determined second signal to obtain a first frequency domain value, perform time domain accumulation and frequency domain accumulation on a modular square of the first frequency domain value, and perform normalization processing on an accumulation result to obtain a first normalization result;
   perform radio frequency processing and analog-to-digital conversion (ADC) on the received first signal to obtain a digital signal, and perform FFT on the digital signal to obtain a second frequency domain value;
   multiply a conjugate of the first frequency domain value by the second frequency domain value, perform time domain accumulation and frequency domain accumulation on an obtained product, and perform normalization processing on an accumulation result to obtain a second normalization result; and
   estimate, according to the first normalization result and the second normalization result, the channel value of the channel over which the second signal transmitted by the transmit port of the first device causes, through the air interface, interference to the service signal received by the receive port of the first device.

7. The estimation device according to claim 6, wherein the processor is further configured to:
   divide the second normalization result by the first normalization result, and consider an obtained quotient value as the estimated channel value of the channel over which the second signal transmitted by the transmit port of the first device causes, through the air interface, interference to the service signal received by the receive port of the first device.

8. The estimation device according to claim 6, wherein the processor is further configured to:
   multiply the channel value by the first frequency domain value, perform inverse fast Fourier transform (IFFT) on an obtained product, and consider a transform result as the estimated self-interference signal of interference that the second signal transmitted by the transmit port of the first device causes, through the air interface, to the service signal received by the receive port of the first device.

9. The estimation device according to claim 6, wherein:
   the processor is further configured to perform radio frequency processing and analog-to-digital conversion (ADC) on an analog signal, in a case that the determined analog signal is the analog signal, to obtain a digital signal corresponding to the analog signal, and perform FFT on the digital signal corresponding to the analog signal to obtain the first frequency domain value.

10. The estimation device according to claim 6, wherein the signal sequence formed by at least one preset character is a signal sequence formed by all zeros.

* * * * *